June 19, 1923.

C. A. PRESCOTT

SPRING COMPRESSOR

Filed Oct. 18, 1921

1,459,692

WITNESSES
Edw. Thorpe
F. J. Foster

INVENTOR
Charles A. Prescott
BY
ATTORNEYS

Patented June 19, 1923.

1,459,692

UNITED STATES PATENT OFFICE.

CHARLES A. PRESCOTT, OF PROVIDENCE, RHODE ISLAND.

SPRING COMPRESSOR.

Application filed October 18, 1921. Serial No. 508,581.

*To all whom it may concern:*

Be it known that I, CHARLES A. PRESCOTT, a citizen of the United States, and a resident of Providence, in the county of Providence and State of Rhode Island, have invented a new and Improved Spring Compressor, of which the following is a full, clear, and exact description.

This invention relates to improvements in spring compressors, an object of the invention being to provide a device of this character with which a valve spring may be quickly compressed, and to provide means for holding the spring in compressed position when it is removed from the compressor.

A further object is to provide a device of this character, which will be simple and practical in construction, strong, durable and efficient in use, and which will be comparatively inexpensive to manufacture.

With these and other objects in view, the invention consists in certain novel features of construction and combinations and arrangements of parts as will be more fully hereinafter described and pointed out in the claims.

Figure 1:
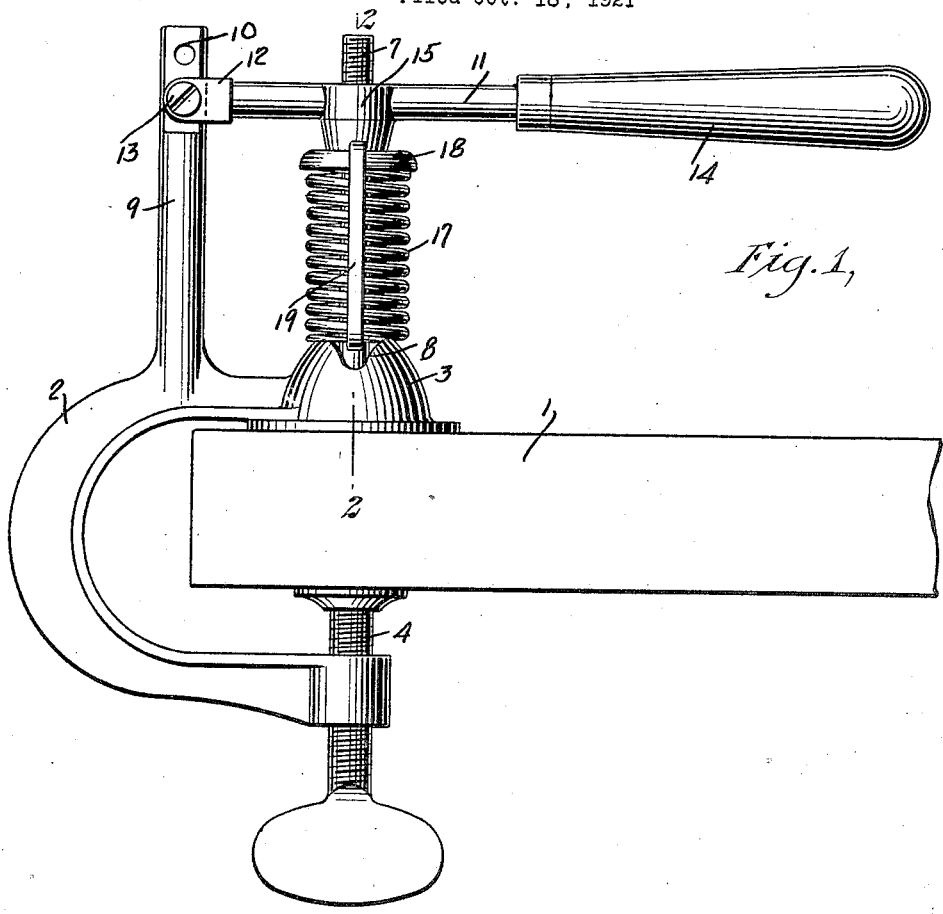
Figure 1 is a view in side elevation showing my improved compressor attached to a support and the manner of use of the same.
Figure 2:
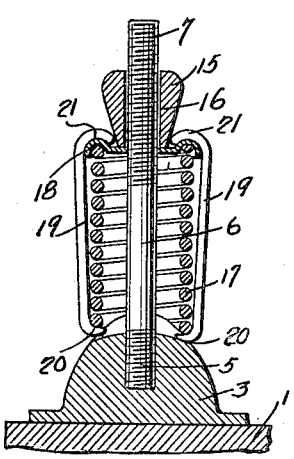
Figure 2 is a view in transverse section on the line 2—2 of Figure 1.

Referring in detail to Figures 1 and 2 of the drawings, 1 represents a supporting bench or table to which my improved compressor is attached. I use the numeral 2 to indicate a U-shaped frame which straddles one edge of the bench 1. One arm of the U terminates in a rounded compressor base 3, which rests upon the table and the other arm of the frame is formed at its extremity with a screw threaded opening through which a clamping screw 4 is movable to clamp the frame firmly to its support. The compressor base 3 is formed with a threaded socket 5 in its upper end and a vertical stud 6 screwed into the socket is also screw threaded at its upper end, as indicated at 7.

It will be noted that the compressor base is formed with a groove 8 extending transversely across its upper end for a purpose which will be hereinafter explained. An upwardly extending post 9 integral with the bracket or frame 2, has a plurality of openings 10 provided at its upper end. A lever 11 includes a bifurcated end 12 straddling the post 9 and a screw or pin 13 serves to selectively pivot the lever in any one of the openings 10. Any suitable handle such as 14 is provided at the free end of the lever. This lever carries a compressor head 15 at its intermediate portion, the head being provided with an opening 16 accommodating the stud 6 and of sufficient size to allow swinging of the lever over the stud.

17 represents a valve spring positioned on the stud 6. The valve spring cup 18 is engaged by the compressor head 15 and the lever is moved to compress the spring. The groove 8 in the compressor base permits the use of a pair of keys such as 19. When the spring is in compressed position, the inwardly presented straight lower ends 20 of the keys are projected into opposite sides of the groove 8 under the valve spring and the upper hooked ends 21 of the keys are hooked over the cup 18. When the lever 14 is raised, the spring may be lifted off the compressor and inserted in the valve, any suitable tool being used to remove the keys 19 after the spring is in position. These keys which are diametrically opposed with relation to the spring not only prevent expansion of the spring, but also prevent its lateral twisting or bending out of shape.

Figure 3:
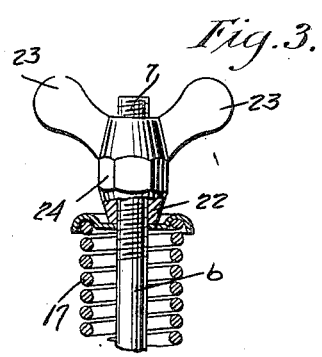
Figure 3 is a fragmentary view similar to Figure 2 showing a modified form of compressor head.

In Figure 3, I have shown a compressor head 22, which has screw threaded engagement with the stud 6, and which is equipped with wings 23 after the manner of a wing nut to permit its manual turning. The body portion of the compressor is preferably angular in shape, as indicated at 24, to permit the use of a wrench when it becomes necessary to compress unusually stiff springs.

Although I have illustrated certain of the preferred embodiments of my invention, it will be obvious that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a spring compressor, a frame adapted to be attached to a support, a compressor base integral with the frame, a lever pivoted on the frame, a compressor head carried by the lever, and a centering device interposed between the base and head.

2. In a spring compressor, a frame adapted to be attached to a support, a compressor base integral with the frame, a lever pivoted on the frame, a compressor head carried by the lever, a centering device interposed between the base and head, and said centering device comprising a post rising from the base and extending through the head.

3. In a spring compressor, a frame adapted to be attached to a support, a compressor base integral with the frame, a lever pivoted on the frame, a compressor head carried by the lever, a centering device interposed between the base and head, said centering device comprising a post rising from the base and extending through the head, and said base having a groove therein to permit the insertion of one end of a key under a spring in the compressor.

4. In a spring compressor including a frame, a conical compressor base having grooves formed in its sides attached to the frame, said conical base serving to support springs of different diameters.

CHARLES A. PRESCOTT.